United States Patent
Borel

(10) Patent No.: US 6,931,248 B2
(45) Date of Patent: Aug. 16, 2005

(54) METHOD FOR SELECTING A GROUND STATION WITHIN AN AERONAUTICAL TELECOMMUNICATIONS NETWORK

(75) Inventor: Matthieu Borel, Toulouse (FR)

(73) Assignee: Thales, Paris (FR)

(*) Notice: Subject to any disclaimer, the term of this patent is extended or adjusted under 35 U.S.C. 154(b) by 472 days.

(21) Appl. No.: 10/129,098

(22) PCT Filed: Sep. 28, 2001

(86) PCT No.: PCT/FR01/03020

§ 371 (c)(1),
(2), (4) Date: May 10, 2002

(87) PCT Pub. No.: WO02/30007

PCT Pub. Date: Apr. 11, 2002

(65) Prior Publication Data

US 2002/0155833 A1 Oct. 24, 2002

(30) Foreign Application Priority Data

Oct. 3, 2000 (FR) .......................................... 00 12605

(51) Int. Cl.$^7$ ................................................ H04Q 7/20
(52) U.S. Cl. ...................................... 455/431; 455/445
(58) Field of Search .................................. 455/431, 98

(56) References Cited

U.S. PATENT DOCUMENTS 5,249,303 A * 9/1993 Goeken ...................... 455/431

6,353,779 B1 * 3/2002 Simon et al. .................. 701/3

FOREIGN PATENT DOCUMENTS

FR 2 787 658 6/2000

OTHER PUBLICATIONS

T.L. Signore et al.: "The aeronautical telecommunication network (ATN)" IEEE Military Communications Conference, pp. 40–44 Oct. 19, 1998.

* cited by examiner

Primary Examiner—Nguyen Vo
Assistant Examiner—Julie E Stein
(74) Attorney, Agent, or Firm—Oblon, Spivak, McClelland, Maier & Neustadt, P.C.

(57) ABSTRACT

A method for an ATN aeronautical telecommunications network to select ground stations giving access to the ATN terrestrial network, by an aircraft in the course of its task. The method equips the on-board router with a database relating to the ATN network containing a file of ground stations graded as a function of the geographical position of the aircraft on its route prepared during the construction of the flight plan, and provides a link between the on-board router and the navigation equipment of the aircraft, allowing the on-board router to know the position of the aircraft on its route and to use this position to select, from the database, the ground stations having the aircraft in their areas of coverage, with an order of preference determined by the company operating the aircraft. This accelerates the choice of a ground station for access to the ATN terrestrial network, while leaving complete control of this choice to the operating company.

2 Claims, 2 Drawing Sheets

METHOD FOR SELECTING A GROUND STATION WITHIN AN AERONAUTICAL TELECOMMUNICATIONS NETWORK

For information exchange between an aircraft and the ground, a new aeronautical telecommunications network, called ATN, defined and standardized by ICAO (acronym designating the International Civil Aviation Organization) is progressively being set up on the surface of the globe. This aeronautical telecommunications network ATN is a digital-data transmission network dedicated to information exchange between aircraft and the ground for activities both of air-traffic control, known as ATC, with the authorities exercising control and regulation of air traffic, and of fleet management, activities known as AOC (abbreviation of "Aeronautical Operational Communication") with the airlines operating the aircraft. It includes an airside part consisting of air-ground telecommunications facilities installed on-board the aircraft, and a terrestrial part consisting of ground stations equipped with air-ground telecommunications facilities making it possible for them to establish communication with the aircraft passing through their areas of coverage, and with routing means allowing them to direct the communications exchanged with the aircraft to air-traffic control centers or airline company management centers. The ground stations are intended, in time, to form a terrestrial network with a grid structure covering the surface of the globe.

The ground-air telecommunications facilities providing the link between an aircraft and a ground station of the aeronautical telecommunications network ATN constitute what is known as a sub-network. They may employ various digital communications modes, including:

an indirect air-ground digital communications mode, via telecommunications satellites operating at UHF according to a specific protocol called "Satcom Data 3", a line-of-sight air-ground digital communications mode, by VHF, according to a specific protocol called "VDL mode 2", a line-of-sight air-ground digital communications mode with a secondary radar, according to a specific protocol called "Mode S", an air-ground digital communications mode at HF according to a specific protocol called "HF DL mode" (abbreviation of the expression "High Frequency Data Link"), the various protocols having been defined and standardized on the occasion of conferences organized by the AEEC (abbreviation for "Airline Electronic Engineering Committee") under the authority of ICAO.

ICAO has issued recommendations defining the protocol exchanges intended to establish a VDL Mode 2 connection between an aircraft and a ground station of the aeronautical telecommunications network ATN, to maintain an established connection, to carry out data exchanges within an established connection and to break off a connection, but does not impose any constraints as regards the choice, by an aircraft, of a VDL mode 2 ground station serving for it to access the terrestrial ATN network and of the sub-network or networks used for the air-ground link with the ground station chosen as an access gateway to the ground ATN network, its standards documents specifying only that the terminal installed on board the aircraft should include a decision unit providing for these choices.

In order for a VDL station to be able to be chosen as an access portal to the terrestrial ATN network, it is necessary for the aircraft to be located in its area of coverage and for the station to be available. It can also happen that several VDL ground stations are available simultaneously, such that the decision unit installed on board the aircraft may still have to choose between several VDL ground stations. The criterion of availability is then insufficient and has to be supplemented by another criterion, called quality of service or QOS criterion, which takes into account the qualities and costs of the available ground stations and of the air-ground communications modes which it is possible to use with them.

The implementing of the quality criterion generally takes place on the basis of a scoring system established by the company operating the aircraft on the basis of parameters which are specific to it, quality of the link, cost of the transmission mode, cost of the service from the ground station, etc. This scoring system is stored in memory in a database installed on board the aircraft and consulted by the decision unit which guides its choice towards the available VDL ground station and the air-ground communications mode or modes allowed by this ground station having the best preference scores.

As the aeronautical communications network ATN is in a phase in which it is still evolving, with continuous growth in the number of ground stations and thus in competition between the access providers, the on-board database used by the decision unit in order to take account of the preferences of the company managing the aircraft, in the choice of a ground station and of the air-ground transmission mode or modes for establishing a link with the ground station selected, has a tendency to expand and to take up an ever greater amount of memory space. Moreover, it has to be updated fairly frequently, which complicates the ground maintenance operations on the aircraft.

SUMMARY OF THE INVENTION

The subject of the present invention is a method for selecting a ground station, especially a VDL ground station, within an aeronautical telecommunications network which is satisfied, for the preferences of the company operating the aircraft, relating to the ground stations, with a relatively restricted database having a simple, practically automatic, means of updating.

A further subject is a method of selecting a ground station within an aeronautical telecommunications network, which allows automatic operation of the decision unit while leaving it very easy to alter the preferences of the company operating the aircraft, relating to the ground stations and to the air-ground communications modes which can be used with the stations.

A further object is to accelerate the process of choosing a ground station.

The subject of the invention is a method of selecting a ground station within an aeronautical telecommunications network including a terrestrial network which can be accessed via a set of ground stations, characterized in that it consists in:

during the preparation of a flight plan for an aircraft, and after determining the route of the aircraft, selecting, from among the ground stations, those with areas of coverage which are within range of the route of the aircraft defined by the flight plan, establishing a database having, as elements, preference scores associated with identifiers denoting pairs each formed by a selected ground station and by one or more air-ground communications modes which are compatible with the equipment of the aircraft and that of the ground station in question, establishing a classification as to the elements of the database based, for each element, on the position of the area of coverage of the ground station to which it relates, with respect to the route of the aircraft defined by the flight plan, the said classification being manifested by an addressing of the elements of the database as a function of the geographical position of the aircraft along the route defined by its flight plan, loading this database on board the aircraft for its subsequent use by an on-board decision unit having the function of selecting the ground station chosen for accessing the terrestrial network and the air-ground communications mode or modes used with the chosen ground station and, upon execution of the flight plan by a flight-management system equipping the aircraft and periodically giving the position of the aircraft on the route defined by the flight plan, having the decision unit select, from the database loaded on board the aircraft, one of the pairs or the ground station air-ground communications mode pair having the best preference score from among those the identifiers of which feature in the database at the address corresponding to the last position of the aircraft communicated by its flight-management system.

The invention starts with the principle that the only ground stations worthy of interest for an aircraft are those which are likely to be available and which therefore have an area of coverage traversed by the route of the aircraft, in order to reduce the on-board database giving the preferences of the operating company to these ground stations alone and to the air-ground communications modes which can be used with them. The selection, during flight preparation, of the elements of the on-board database relating to the preferences of the operating company concerning the ground stations the area of coverage of which is traversed by the route of the aircraft and the ground-air communications modes which can be used with them is an additional operation which only very slightly complicates preparation for a flight, since it can be carried out, once the flight plan is known, by an automatic unit operating on a database centralizing, on the ground, all the preferences of the operating company, available in a ground management center and constantly updated. Moreover, this operation of selection, upon each flight preparation, guarantees systematic renewing of the on-board database and thus automatic follow-up of the updates of the preferences of the operating company which then only have to be carried out once on a centralized database.

BRIEF DESCRIPTION OF THE DRAWINGS

Other characteristics and advantages of the invention will emerge from the description below of an embodiment given by way of example. This description will be given with regard to the drawing in which.

DESCRIPTION OF THE PREFERRED EMBODIMENTS

The aeronautical telecommunications network ATN aims to provide reliable and high-throughput digital ground-air links for information exchange between aircraft on the ground or in flight and ground centers, whether these centers are assigned to air-traffic control activity, the information exchanged with the air-traffic control authorities being called ATC information, or to a business operating the aircraft, the information exchanged with the company or companies operating the aircraft being called AOC information, the distinction between the two types of information being justified by different transmission constraints in terms of security and reliability. It is designed to use the various media which can be envisaged for air-ground links (HF, VHF, S-mode radar, UHF by satellite) and to use, on the ground, specialized or non-specialized data-transmission networks, switched or otherwise, by cable or radio waves, relayed by satellite or otherwise, so as to have the information transmitted arrive at its destination.

Figure 1:
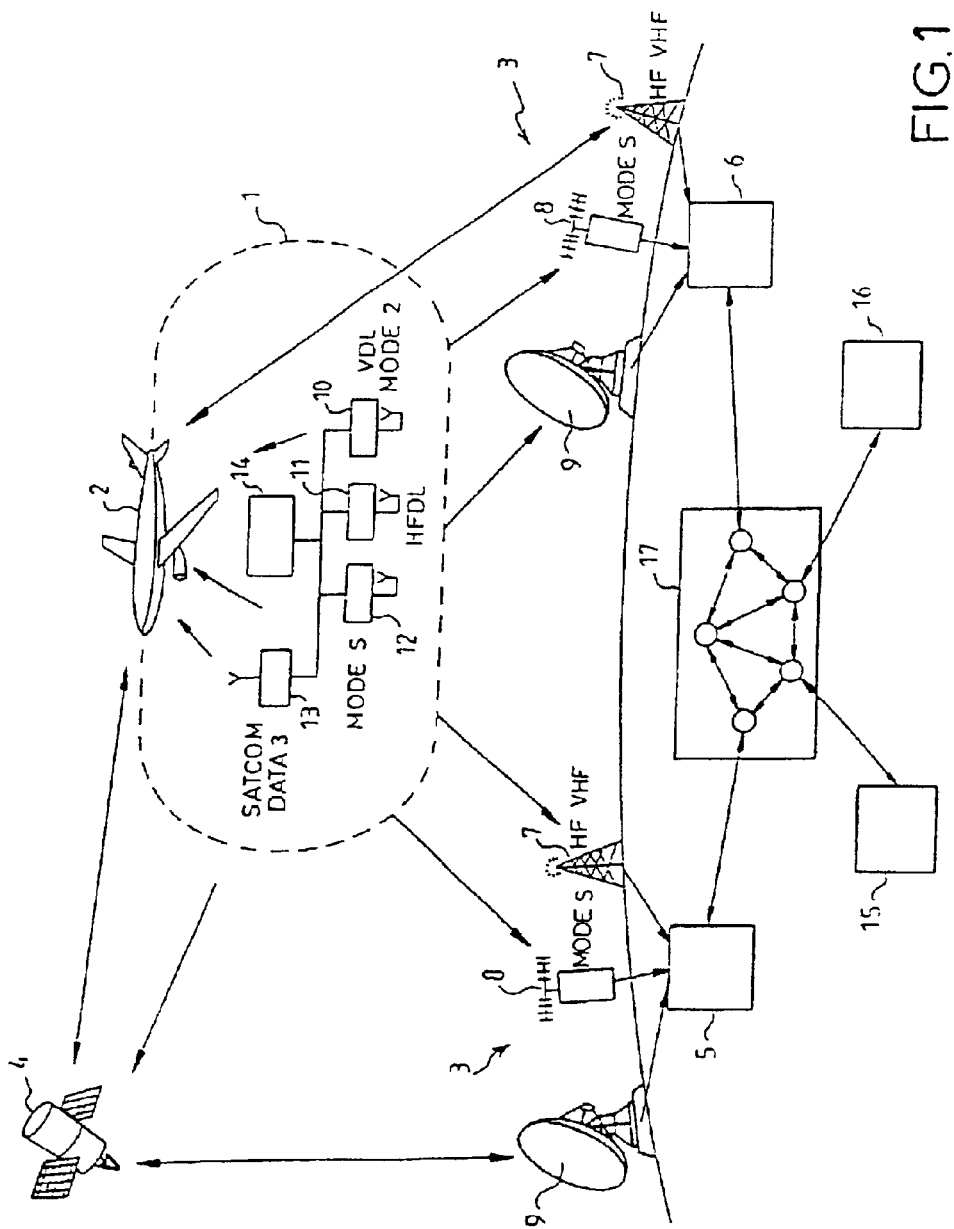
FIG. 1 diagrammatically shows the aeronautical telecommunications network ATN, and FIG. 2 diagrammatically shows an on-board aeronautical telecommunications network ATN router.

As represented in FIG. 1, the aeronautical telecommunications network ATN includes an airside part 1 on board each aircraft 2 connected and a terrestrial part 3.

The airside part 1 is made up of various pieces of transmitter/receiver equipment installed on an aircraft 2 and suitable for the various media which can be used for the air-ground communications. This transmitter/receiver equipment and its corresponding units on the ground constitute transmission sub-networks. In FIG. 1 an aircraft 2 is represented with an airside aeronautical transmission network ATN part 1 including several transmitters/receivers including a transmitter/receiver 10 constituting a VDL-mode transmission sub-network head end operating in VHF according to a standardized specific protocol, a transmitter/receiver 11 constituting an HFDL-mode transmission sub-network head end operating in HF according to another standardized specific protocol, a transmitter/receiver 12 constituting a S-mode-transmission sub-network head end operating at UHF in collaboration with a secondary radar according to another, likewise standardized, protocol, and a transmitter/receiver 13 constituting an AMSS (abbreviation for "Aeronautical Mobile Satellite System") Satcom data mode communications sub-network head end 3 operating at UHF with a satellite relay 4, according to yet another standardized protocol. These various transmitters/receivers 10, 11, 12, 13 may feature common parts, such that the various sub-networks may not all be available simultaneously. They may not even be present in full on an aircraft, this depending on the level of equipment fit of the aircraft in question. They are managed on board an aircraft by an automatic unit 14 called a router which, in addition to managing them, undertakes, by manipulating a memory stack in which transit the data to be exchanged with the ground, the initialization, the maintenance and the completion of an applications communication under the control of a software module called CMA (abbreviation of the expression "Context Management Agent"), the maintenance and the completion of a sub-network connection under the control of a software module called SN-SME (abbreviation of the expression "Sub-Network System Management Entity"), the routing of a communication under the control of a software module called IDRP (abbreviation of "Inter Domain Routing Policy"), the running of preloaded applications for air-traffic control such as the periodic communication of the position of the aircraft to the ground control under the control of a software module called "ATC Applis", and the running of preloaded fleet-management applications such as the monitoring of the consumption by the aircraft under the control of a software module called "AOC Applis".

The terrestrial part of the aeronautical telecommunications network ATN consists of ground stations 5,6. These ground stations 5,6 are equipped with ground-air communications facilities, HF-VHF transmitters/receivers 7, S-mode radar 8, satellite communications ground station 9, allowing them to communicate with the aircraft passing in the vicinity according to one or more communications modes provided for: Satcom Data 3 sub-network, VDL mode 2 sub-network, Mode S sub-network or HFDL-mode sub-network, and linked together and to various ground centers 15, 16 interested in the information exchange with the aircraft, via specialized or non-specialized digital data-transmission networks 17, switched or otherwise, using cable or radio waves relayed by satellite or otherwise.

An air-ground information exchange takes place at the initiative of an aircraft. When an aircraft has to communicate with the ground, its router, via one of the communications sub-networks available to the aircraft, sends out an applications connection request for access to the ATN terrestrial network called "CEM-logon.request") (CM originating from the abbreviation "Context Management") which encloses the identity of the requesting router in the form of an ISH (abbreviation for "Intermediate Signal Hello") signal and certain of its characteristics which are of use for configuring an air-ground link. This dictates that, beforehand, a link has been established at the level of the sub-network. To do this, the aircraft continuously scans the availability of the sub-networks with which it is able to communicate. When sub-network connectivity information arrives at the router, it is forwarded to the SN-SME module which will have to decide on the establishing of a link.

In fact, the router of an aircraft can receive one or more proposals for access connection on the part of ground stations, with one or more options for sub-networks for the air-ground link. Thus, upon initialization of a connection, the on-board router of an aircraft has to be capable of making choices at the level of the ground station to be used for access to the ATN terrestrial network when several ground stations are offering their services, as well as at the level of the sub-network or networks to be used when several are offered for access to the same ground station. For example, in the case of the VDL (abbreviation for the expression VHF Data-Link) Mode 2 sub-network, the choice of the ground station thus takes place via the SN-SME module.

In order to decide among the various solutions for access to the ATN terrestrial network which can be presented simultaneously to the router of an aircraft, it is acknowledged that the router of the aircraft should be provided with a memory-stored database enclosing, for each ground station of the ATN network and, as regards a ground station, for each sub-network likely to be used with it:
the guidelines from the pilot,
the guidelines from the company operating the aircraft,
the cost,
the performance, the security, reliability,
the airplane configuration, that is to say the sub-network head ends actually installed,
capability in terms of dynamic range, and
to equip its SN-SME software module with a scoring program generating a preference score for each pair consisting of an available ground station associated with a sub-network capable of being used with it, and with a selection program selecting the ground-station/communications-sub-network pair having the best preference score.

Figure 2:
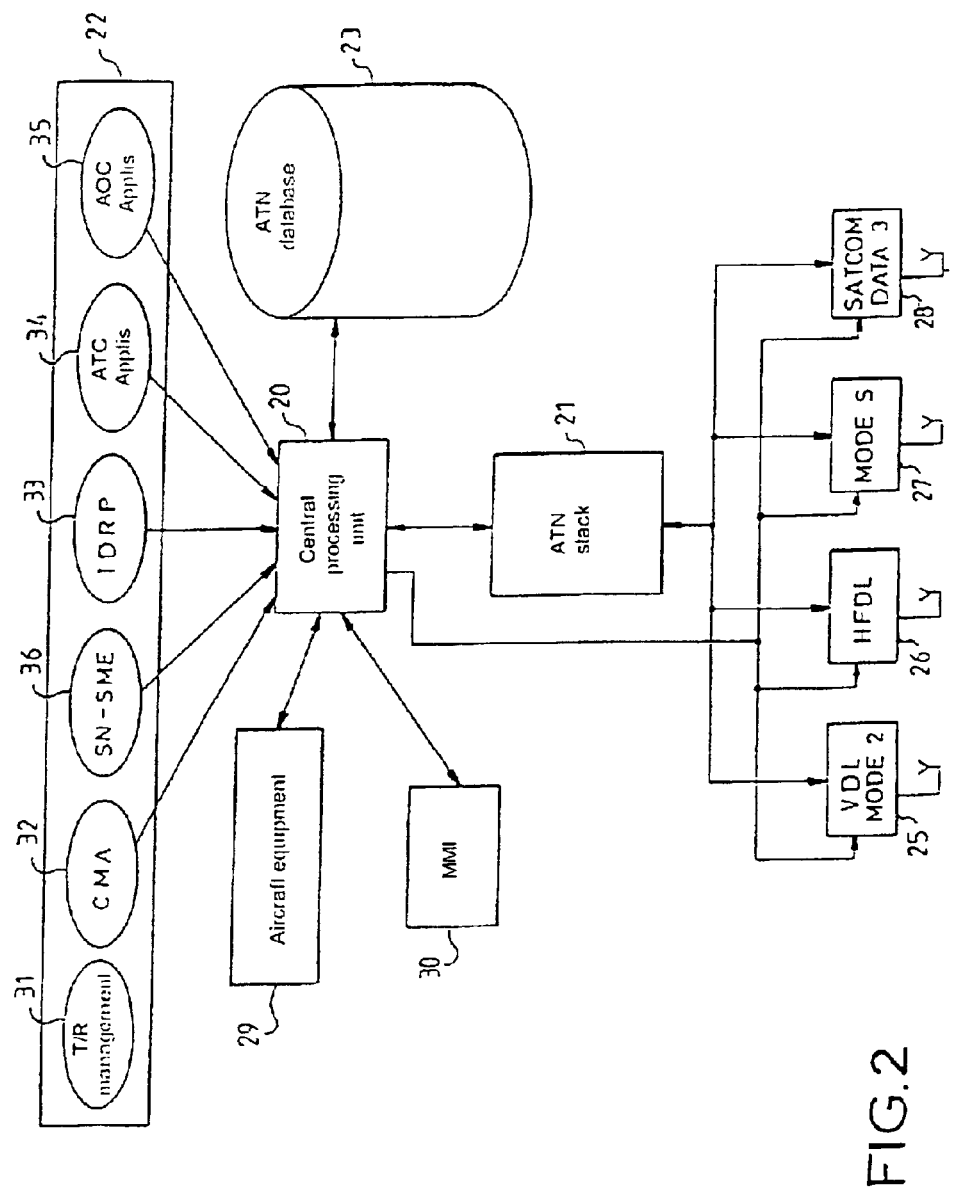

FIG. 2 diagrammatically illustrates an example a router hardware and software architecture for an on-board ATN aeronautical telecommunications network router. Such arbiter consists of a specialized computer especially including a central-processing unit 20, a memory, and various input/output interfaces.

The memory includes various parts, principally including:
a part 21, called ATN stack, with registers the manipulation of which by the central processing unit 20 allows application of the transmission protocols of the ATN network both in order to generate the data stream sent from on board to the ground from information to be transmitted and from service information used for the establishing, maintaining and conclusion of a link within the ATN network, as well as for the extraction of information contained in the data stream received from the ground in the course of a link and for redirecting it to the on-board equipment involved,
a part 22 used for storage of an ATN database on the various ground stations and the communications sub-networks which they allow.

The input/output interfaces link the on-board router with various pieces of equipment of the aircraft, which are essentially:
the various transmitter/receiver systems 25, 26, 27, 28 of the aircraft, capable of acting as air-ground communications sub-network head ends for the ATN network,
the equipment 29 of the aircraft capable of being made to use the ATN network in order to exchange information with the ground, and
at least one man-machine interface MMI 30 such as, for example, the MCDU, allowing a dialogue between the on-board router and the crew of the aircraft so that the latter can give instructions to the router and extract sundry information from it on the status of the links established via the ATN network.

As indicated above, an on-board router is equipped with various software modules run in time-sharing mode by its central-processing unit 20. Among these software modules, the main ones are:
a software module 31 for management and distribution of tasks managing the activities of the various on-board transmitters/receivers 25, 26, 27, 28, possibly serving as a communications sub-network head end,
a CMA software module 32 tasked with the initialization, the maintenance and the cutting-off of an applications link,
an SN-SME software module 36 tasked with the initialization, the maintenance and the cutting-off of a sub-network link,
an IDRP software module 33 tasked more specifically with the routing,
an "ATC Applis" software module 34 tasked with running the tasks relating to air-traffic control, and
an "AOC Applis" software module 35 tasked with running the tasks relating to the management of the aircraft.

These various software modules will not be detailed, since they do not form part of the invention. They are designed by specialists in software engineering, having regard simultaneously to the specific requirements of the equipment installed on board the aircraft, to the standardized protocols of the ATN network and to the features desired by the air-traffic control authorities and by the company operating the aircraft.

At the present time, once the CMA software module has determined the necessity for a link with the ground by way of the ATN network, it activates the IDRP routing software module which carries out a reconnaissance of the available ground stations and of their capabilities in terms of air-ground communications sub-networks according to a standardized procedure and, on the basis of the results of this reconnaissance, establishes the possible address or addresses, in the ATN network, of the correspondent to be contacted. In fact, an ATN address, called NSAP (abbreviation for the expression "Network Service Access Point"), consists of a binary word coded according to a hierarchical tree structure with several information fields making it possible to perform the routing within the ATN topology including, in the prefix, the address of the ground station serving for access to the ATN network. When there are several NSAP addresses proposed by the IDRP software module, as is the case when several communications sub-networks or several ground stations are available, the SN-SME software module has to choose one among them. For this choice, the SN-SME software module may call on the pilot, but that adds to the other existing tasks in his workload. Hence, it is sought to automate this choice, equipping the SN-SME software module with a program for choosing an NSAP address in the event of multiple options, establishing, for each possible NSAP address, a preference score drawn from information on the ATN network stored in a on-board database and choosing the NSAP address having obtained the best preference score.

This database, which is the one stored in the memory part 23, encloses information relating to the ground stations and to the air-ground communications sub-networks which they allow, especially:

the guidelines from the pilot, the guidelines from the company operating the aircraft, the costs, the security, reliability, ownership of the ground stations by such or such an access provider, the nationality of the ground station, etc.

As the ATN network is in a phase in which it is still evolving, with continuous growth in the number of ground stations and thus in competition between the providers of access to the terrestrial network, this database has a tendency to expand and to take up an ever greater amount of memory space. Moreover, it has to be updated fairly frequently in order to follow the evolution of the ATN network and of the commercial offerings from the access providers.

In order to remedy these problems, it is proposed to limit the coverage of the on-board database bringing together the information on the ATN network to only the ground stations placed on the route or in proximity to the route anticipated in the flight plan of the aircraft, and even to equip this database with a classification of its information on the basis of the availability of the ground stations adopted, having regard to the position of the aircraft on its anticipated route. This limitation and this classification are easy to implement if the on-board database relating to the ATN network is constructed during the preparation of the flight plan. In fact, during this preparation, it is easy, once the route intended for the aircraft is known, to use this route in order to select the ground stations whose area of coverage it will pass through, within a database bringing together, on the ground, all the preferences of the operating company as to the ground stations of the ATN network, their geographical locations and their individual areas of coverage, this selection operation possibly being carried out entirely automatically by an automatic unit specially programmed for this purpose.

The renewing, upon each flight-plan preparation, of the on-board database relating to the ATN network, allows an operating company to carry over all the updates onto a single global, centralized, reference database, and possibly a few replicas, which can be interrogated remotely and which are situated in its centers of operations.

The selection operation reduces the volume of the on-board database devoted to the ATN network, which reduces the requirements in terms of memory capacity of an on-board router.

The classification of the information of the on-board database relating to the ATN network as a function of the position of the aircraft on its route intended in the flight plan gives a rapid means of knowing, on the basis of the position of the aircraft as supplied by its navigation equipment, the set of ground stations actually having the possibility of being available. By virtue of it, with the program for choice of address of the ground station of the SN-SME software module having access directly to the addresses of the ground stations normally available since the aircraft is then located in their areas of coverage, it is even conceivable to dispense with the stage of recognition between the router installed on board the aircraft with the ground routers and to attempt a direct call to the NSAP address featuring the best preference score. In fact, failure is improbable as long as the centralized database is correctly updated, since it is certain that the aircraft is located in its area of coverage. If, despite everything, the link cannot be established as a result of saturation or malfunction of the ground station selected, it is possible to fall back on the NSAP address of immediately lower ranking in the classification by preference score delivered by the on-board database for the position in question of the aircraft. This classification, by taking account of the position information delivered by the navigation equipment of the aircraft, allows an acceleration of the procedures for establishing a communication via the ATN network while leaving the companies and the pilot complete freedom as to the choice of the ground station used as point of access to the ATN terrestrial network.

The architecture of the on-board router is not rendered more complex, if only because it is already interfaced with the navigation equipment of the aircraft for carrying out certain tasks coming under air-traffic control by the one "ATC Applis" software module 34 such as the periodic signaling of the position of the aircraft as estimated by its navigation equipment, for example.

In summary, the method is based on the exchange of information between the navigation equipment of the aircraft, such as a flight-management system FMS and the on-board ATN router containing the software controlling the air-ground communications system, and on the use of an on-board database containing a configuration file controlled by the operator of the aircraft, making it possible to define ground stations, with an order of preference, to be chosen on the basis of the position of the aircraft, as point of access to the ATN terrestrial network. This makes it possible to simplify the procedures for establishing a connection while leaving great autonomy to the operator of the aircraft.

In practice, the on-board database relating to the ATN network consists of a file forming a correspondence between the geographical situation and the ground stations which it is possible to choose, allocated a preference score attributed by the operator of the aircraft. The file is defined during the preparation of the flight plan on the basis of the route intended for the aircraft and of a global file bringing together the preferences of the operator of the aircraft as to the ground stations of the ATN network and the communications sub-networks which can be used to set up communications with each of them. For each geographical position of the aircraft along its route, it gives the ground stations accessible, that is to say enclosing this geographical position in their areas of coverage, graded according to an order of preference. Once defined, it is loaded before the departure of the aircraft into the router of the aircraft, preferably at the moment when the flight plan is loaded into the flight-management system.

When the aircraft is traveling its route, it happens that the area of coverage of the ATN network ground station changes. It is warned of this by the reception of information called MO (abbreviation for "Managed Object") information. This MO information is used by the SN-SME software module of the on-board router in order:

either, for reasons defined in the standardization documents, to change over to a stipulated ground station, or to consult the geographical position given by the navigation equipment, select the ground stations featuring in the on-board database relating to the ATN network, at the address corresponding to the geographical position obtained, and to choose, from among the ground stations selected, the one with which to communicate, while taking account of the order of preference deduced from the memory-stored information.

Once the next ground station with which to make contact has been determined, the SN-SME software module of the router inserts, into the communications stack, the messages defined by the standards of the ATN network and intended to notify a change of ground station.

In the course of the flight of the aircraft, the operating status of certain ground stations of the ATN network may change, or the flight plan of the aircraft may be altered. The information of the on-board database relating to the ATN network then becomes out of date.

In the case of a ground station becoming unavailable, the connection attempt fails by itself in the absence of a response from the station, and the choice falls on the next ground station appearing in the list supplied by the database, graded in order of preference. If there is none, several options can be envisaged: attempt at connection with a previous ground station, by artificially retarding the position of the aircraft on its route, or with a future ground station by artificially advancing the position of the aircraft on its route, await penetration into the area of coverage of another ground station if the messages to be delivered to the ground do not exhibit any particular urgency. However, the case of a ground station becoming unavailable unpredictably should be seen as highly improbable, since that means that all its means of air-ground communication via the various sub-networks become suddenly unavailable.

In the case in which the flight plan is altered en route, two possibilities arise: either the database has been designed to be sufficiently extensive in terms of geographical position/ground-station address pairs to cover the offset with respect to the initial route, or the database no longer covers the current position of the aircraft, which can occur only if the offset with respect to the flight plan is significant, greater than 300 km, and the pilot manually enters the address of a ground station to be contacted. In the context of the upgrades required by ICAO for air-ground communications, it is anticipated that the messages relating to alterations to the flight plan will be exchanged with air-traffic controllers. These could then add, to the communications stack of the aircraft, information for automatic switch-over to a ground station covering the region in which the aircraft is located.

By comparison with a conventional on-board database, even an incomplete one, relating to the ATN network, the fact of adopting a classification as a function of the geographical position of the aircraft accelerates the process of choosing a ground station of the ATN network since, during a flight path overflying numerous areas of coverage of ground stations, it is no longer necessary to compare the information on ground-station availability reaching the aircraft with all the information contained in the database. Moreover, this leaves full control of the communications to the operating company which, that being so, can exercise better control of the costs of communication.

What is claimed is:

1. A method of selecting a ground station within an aeronautical telecommunications network including a terrestrial network that can be accessed by a set of ground stations, the method comprising:

during preparation of a flight plan for an aircraft, and after determining a route of the aircraft:
selecting, from among the ground stations, those ground stations within a range of the route of the aircraft defined by the flight plan, and disregarding ground stations outside of the range of the route of the aircraft defined by the flight plan;
establishing a database having, as elements, preference scores associated with identifiers denoting pairs each formed by the selected ground stations and by one or more air-ground communications modes compatible with a ground station in question;
establishing a classification as to the elements of the database based, for each element, on a position of the area of coverage of the ground station to which it relates, with respect to the route of the aircraft defined by the flight plan, the classification being manifested by an addressing of the elements of the database as a function of the position of the aircraft along the route defined by its flight plan; and
loading the database on board the aircraft for its subsequent use by an on-board decision unit having a function of selecting the ground station chosen for accessing the terrestrial network and the air-ground communications mode or modes used with the chosen ground station;

upon execution of the flight plan by a flight-management system equipping the aircraft and periodically giving the position of the aircraft on the route defined by the flight plan:
having the decision unit select, from the database loaded on-board the aircraft, one of the pairs or the ground-station air-ground and ground air communications mode pair having the best preference score from among these the identifiers of which features in the database at the address corresponding to the last position of the aircraft communicated by its flight-management system.

2. The method of claim 1, wherein the preference score considers for the ground stations:

guidelines from the pilot;
guidelines from the company operating the aircraft;
costs;
security and reliability;
ownership of the ground stations; and
nationality of the ground stations.

* * * * *